April 2, 1940. M. SALZ 2,195,828
FRUIT JUICE EXTRACTOR
Filed Nov. 18, 1938
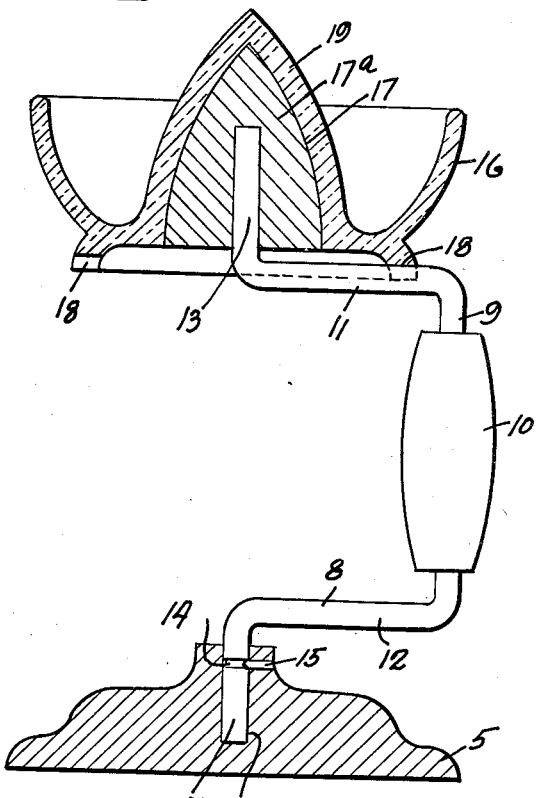
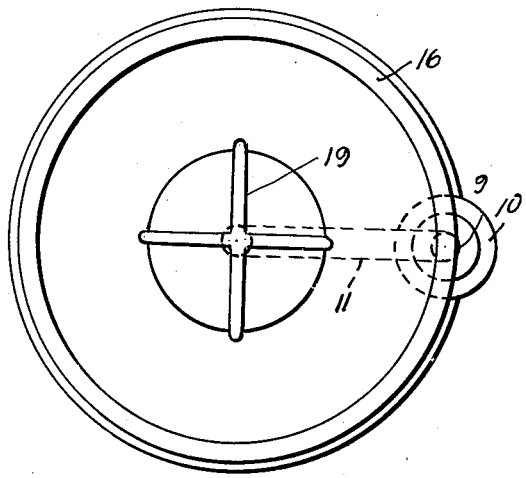
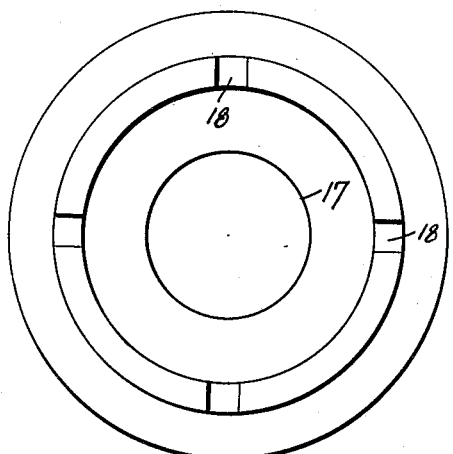
INVENTOR.
Max Salz
BY Maurice Bloch
ATTORNEY.

Patented Apr. 2, 1940

2,195,828

UNITED STATES PATENT OFFICE 2,195,828

FRUIT JUICE EXTRACTOR

Max Salz, New York, N. Y.

Application November 18, 1938, Serial No. 241,115

5 Claims. (Cl. 146—3)

This invention relates to fruit juice extractors and more particularly to devices of this nature especially adapted for the extraction of the juices from citrus fruit.

One object of the invention is the provision of a juice extractor of this nature comprising a rotatable crank which carries at its upper end an extractor bowl adapted to rotate with the crank, the said bowl being readily removably maintained upon the said crank.

Another object is to produce a device of the character described in which the maximum simplicity of construction and operation is secured.

Other objects and advantages will appear as the nature of the improvements is better understood, the invention consisting substantially in the novel arrangement and co-relation of parts herein fully described and illustrated in the accompanying drawings, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawing, in which—

Figure 1 is a longitudinal sectional view through the center of my improved extractor;

Fig. 2 is a top plan view thereof; and

Fig. 3 is a bottom plan view of the extractor bowl.

Referring now to the drawing in detail, 5 indicates a base having a central opening or bore 6 in which is rotatably mounted the lower end 7 of a crank shaft 8. The said crank shaft 8 is provided with a central offset or eccentric portion 9 upon which there may be suitably secured a handle or grip 10. The said handle is located between the upper and lower crank arm portions 11 and 12 respectively, the upper arm 11 being bent at preferably a right angle from the upper shaft portion 13 and the lower arm 12 being similarly bent from the lower shaft portion 7. The said shaft portion 7 is provided with a groove 14 into which there extends a pin or projection 15 to prevent accidental displacement of the shaft with respect to the base 5.

A fruit juice bowl 16 having a central conical chamber 17 and one or more grooves or flutes 18 is supported at the top of the crank shaft 8; the shaft extension 13 is provided with a conical head 17a which fits freely into the chamber 17 and the arm 11 is nested in one of the grooves 18. The bowl 16 is provided with the usual reamer portion 19 in which the conical chamber 17 is centrally located. The head 17a may be made of any material suitable for the purpose.

It is to be understood that the shaft ends 7 and 13 are in axial alinement with each other, and that the groove 18 with which the arm 11 is in engagement prevents relative movement of the bowl with respect to the crank shaft 8.

In operation the user presses the fruit from which the juice is to be extracted against the reamer portion 19, and with the other hand gripping the handle 10, he rotates the crank shaft which carries the bowl 16 with it in its rotary motion. When the juice is extracted the bowl is lifted off the crank shaft and the juice is then poured off.

From the foregoing it will be seen that I have provided a comparatively simple, inexpensive, yet highly efficient juice extractor adapted for use in the home or in restaurants, etc. for rapidly and easily extracting the juices of citrus fruit and the like.

Having described my invention, what I claim as new and desire to secure by Letters Patent is:

1. In a fruit juice extractor, a supporting base having a bore therein, a crank shaft rotatably mounted at its lower end in the said bore, the said shaft comprising axially alined upper and lower portions, an upper and lower arm extending respectively from the said shaft portions, an offset portion connecting the said arms, a juice extracting bowl mounted on the upper shaft portion, and a base on the bowl having a radially extending groove therein in engagement with the upper arm to prevent relative rotary movement between the said shaft and bowl.

2. In a fruit juice extractor, a supporting base having a bore therein, a crank shaft rotatably mounted at its lower end in the said bore, the said shaft comprising axially alined upper and lower portions, an upper and lower arm extending respectively from the said shaft portions, an offset portion connecting the said arms, a juice extracting bowl mounted on the upper shaft portion, a base on the bowl having a radially extending groove therein in engagement with the upper arm to prevent relative rotary movement between the said shaft and bowl, and a handle on the offset portion by which the crank shaft may be rotated.

3. In a fruit juice extractor, a crank shaft comprising an upper and a lower shaft portion in axial alinement with each other, a conical head on the upper shaft portion, an upper horizontal arm extending from the upper shaft portion, a lower horizontal arm extending from the lower shaft portion, a vertical offset portion connecting the said arms, a base in which the lower crank shaft end is rotatably mounted, and a juice extracting bowl having a central chamber, for receiving the head on the upper shaft end, the said bowl also having a radially extending groove for the reception of the upper arm to prevent relative rotation between the bowl and shaft.

4. In a fruit juice extractor, a crank shaft comprising an upper and a lower shaft portion in axial alinement with each other, an upper horizontal arm extending from the upper shaft portion, a lower horizontal arm extending from the lower shaft portion, a vertical offset portion connecting the said arms, a base in which the lower crank shaft end is rotatably mounted, a juice extracting bowl supported on the upper shaft end, the said bowl also having a radially extending groove for the reception of the upper arm to prevent relative rotation between the bowl and shaft, and means for preventing accidental displacement of the lower shaft portion with respect to the base.

5. A fruit juice extractor, comprising a supporting base, a crank shaft rotatably mounted on the said base, the said shaft having axially alined upper and lower portions, a cone-like head rigidly attached to the upper portion, a bowl provided with a centrally disposed reamer cone adapted to fit and be removably supported on the said cone head, and means to prevent relative rotary movement between the shaft and bowl.

MAX SALZ.